(12) United States Patent
Hsu et al.

(10) Patent No.: US 8,027,331 B2
(45) Date of Patent: Sep. 27, 2011

(54) DATA TRANSMISSION METHOD AND COMMUNICATION SYSTEM USING THE SAME

(75) Inventors: Ya-Ling Hsu, Tainan County (TW);
Chi-Shiu Chen, Taipei County (TW);
Yu-Kai Huang, Taichung (TW);
Tzu-Jane Tsai, Hsinchu County (TW);
Ai-Chun Pang, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 834 days.

(21) Appl. No.: 12/046,443

(22) Filed: Mar. 11, 2008

(65) Prior Publication Data
US 2009/0154393 A1    Jun. 18, 2009

(30) Foreign Application Priority Data
Dec. 18, 2007 (TW) ................ 96148460 A

(51) Int. Cl.
*H04L 12/28* (2006.01)
(52) U.S. Cl. ........................................ 370/351
(58) Field of Classification Search .......... 370/445
See application file for complete search history.

(56) References Cited

U.S. PATENT DOCUMENTS

| | | | | |
|---|---|---|---|---|
| 4,707,829 A | * | 11/1987 | Pendse | 370/445 |
| 7,457,973 B2 | * | 11/2008 | Liu | 713/310 |
| 2004/0233876 A1 | * | 11/2004 | Nakashima et al. | 370/338 |
| 2005/0190784 A1 | * | 9/2005 | Stine | 370/445 |
| 2007/0058661 A1 | * | 3/2007 | Chow | 370/445 |
| 2008/0069040 A1 | * | 3/2008 | An | 370/329 |

OTHER PUBLICATIONS

Article titled "Performance Analysis of Priority Schemes for IEEE 802.11 and IEEE 802.11e Wireless LANs" authored by Yang Xiao, IEEE Transactions on Wireless Communications, vol. 4, No. 4, Jul. 2005, (pp. 1506-1515).
Article titled "Impact of France Size, Number of Stations and Mobility on the Throughput Performance of IEEE 802.11e" authored by J. del Prado Pavon, et al., WCNC. 2004 IEEE Communications Society Mar. 2004, (pp. 789-795).
Article titled "Understanding 802.11e Contention-Based Prioritization Mechanisms and Their Coexistence with Legacy 802.11 Stations" authored by Bianchi et al., IEEE Network, Jul./Aug. 2005, (pp. 28-34).
Article titled "Admission Control in IEEE 802.11e Wireless LANs" authored by Gao, et al., IEEE Network, Jul./Aug. 2005(pp. 6-13).

(Continued)

*Primary Examiner* — Chi Pham
*Assistant Examiner* — Fan Ng
(74) *Attorney, Agent, or Firm* — Jianq Chyun IP Office

(57) ABSTRACT

A data transmission method suitable for a communication system is provided. The communication system includes a plurality of first stations which uses an 802.11 protocol and a plurality of second stations which uses an 802.11e protocol and supports Quality of Service (QoS). The data transmission method includes following steps. One of the second stations is used as a Contention AssisTance (CAT) station to obtain a medium access right with a first access category (AC). The second station broadcasts a CAT packet to all the first stations and the other second stations. The other second stations stop contending for the medium access right for a first predetermined time according to the CAT packet, and the first stations transmit a packet with a QoS requirement according to the CAT packet.

18 Claims, 15 Drawing Sheets

OTHER PUBLICATIONS

Article titled "Physical Rate Based Admission Control for HCCA in IEEE 802.11e WLANs" authored by Gao, et al., Proceedings of the 19th International Conference on Advanced information Networking and Applications, 2005 (pp. 479-483).

Article titled "Protection and Guarantee for Voice and Video Traffic in IEEE 802.11e Wireless LANs" authored by Xiao, et al., Proc. IEEE INFOCOM' 04 (pp. 2152-2162).

Article titled "Equilibrium Analysis of Coexisiting IEEE 802.11e Wireless LANs" authored by Mangold et al., The 14th IEEE 2003 International Symposium on Personal, Indoor and Mobile Radio Communication Proceedings (pp. 321-325).

Article titled "Call Admission Control for IEEE 802.11 Contention Access Mechanism" authored by Pong et al., IEEE GLOBECOM 2003, (pp. 174-178).

* cited by examiner

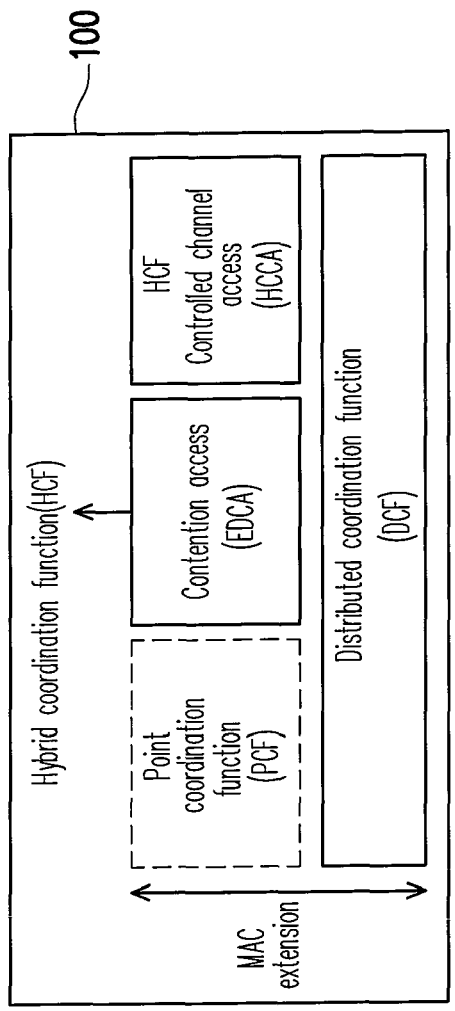

DATA TRANSMISSION METHOD AND COMMUNICATION SYSTEM USING THE SAME

CROSS-REFERENCE TO RELATED APPLICATION

This application claims the priority benefit of Taiwan application serial no. 96148460, filed on Dec. 18, 2007. The entirety of the above-mentioned patent application is hereby incorporated by reference herein and made a part of this specification.

BACKGROUND OF THE INVENTION

1. Field of the Invention

The present invention relates to a data transmission method and a communication system using the same.

2. Description of Related Art 802.11 wireless network technique provided by the Institute of Electrical and Electronics Engineers (IEEE) has become the mainstream in the wireless network market under the strong promotion of the WiFi alliance for it is easy to install and uses only license-free bands. However, according to the original specification of 802.11 standard, all 802.11 STAs (stations) (legacy 802.11 stations) share and equally contend for the same medium. Thus, it is impossible to assign these 802.11 STAs different priorities for the contention according to the requirements of their packets to the Quality of Service (QoS). Accordingly, the IEEE designated an 802.11e team in 1999 to establish two medium access mechanisms: enhanced distributed channel access (EDCA) mechanism and hybrid coordination function (HCF) controlled channel access (HCCA) mechanism. Both of these mechanisms are backward compatible to conventional 802.11 medium access control (MAC) mechanisms, such as the distributed coordination function (DCF) and the point coordination function (PCF).

FIG. 1 illustrates the infrastructure of the EDCA mechanism, the HCCA mechanism, and the conventional 802.11 MAC mechanisms DCF and PCF. Referring to FIG. 1, the infrastructure 100 includes DCF, PCF, EDCA mechanism for HCF contention access, HCCA, and HCF, wherein these mechanisms are all within the extension of the MAC layer.

The shortcoming of DCF is that the idling time will decrease along with the increase of the contention between a plurality of workstations for a wireless medium. The shortcoming of PCF is that the polling method adopted has low efficiency. The 802.11e standard can provide better Quality of Service (QoS) to wireless networks in the MAC layer through aforementioned mechanisms.

The format of a MAC packet in the IEEE 802.11 standard is slightly changed in the IEEE 802.11e standard, wherein a two bytes traffic category identifier (TCID) field is added in the header of the MAC packet, and the last three bits in the TCID field are used for indicating the level of a workstation which transmits the packet. Totally eight levels can be distinguished by the three bits.

According to the EDCA mechanism, a priority is assigned to each transmission data, and the data having higher priority is first transmitted. The priority is related to the carrier sense time, the compensation time, and the frame transmission time. Voice data has the highest priority, and video data is next to it. It is considered that terminals are increased and accordingly the compensation time is further prolonged if a data transmission fails. According to the HCCA mechanism, priorities are assigned by a hybrid coordination program. Each terminal has to notify the hybrid coordination program in advance about the information, such as the data type, the desired band width, and the time duration thereof. Based on such information, the hybrid coordination program assigns the priorities to the terminals or performs a polling operation on all the terminals.

FIG. 2 illustrates the preset value of an EDCA parameter set, wherein AC_BE represents the optimal performance (with higher priority), AC_BK represents the background (with lower priority), AC_VI represents the video (with the highest priority), and AC_VO represents the voice (with the highest priority). In addition, CWmin represents the minimum value of a contention window, CWmax represents the maximum value of the contention window, and AIFSN represents a collision sense signal. These parameters may affect the deferring time of the access category. The values of AC_VI and AC_VO should be set to lower values if voice or video service is used, and the values of AC_BE and AC_BK should be set to higher values if E_mail or webpage service is used.

The DCF access parameters for the conventional 802.11 standard are as followings: CWmin has value aCWmin(31), CWmax has value aCWmax(1023), and DIFS is corresponding to the arbitration inter-frame space (AIFS) having AIFSN as 2. It can be observed through comparison that the medium access priority of DCF is between AC_BE and AC_VI. However, because 802.11e standard and 802.11 standard have different designs in the backoff countdown mechanism, the medium access priority of DCF is substantially corresponding to AC_BE (as shown in FIG. 3) according to the experimental result of the reference article "Understanding 802.11e contention-based prioritization mechanisms and their coexistence with legacy 802.11 stations" by G. Bianchi, I. Tinnirello, and L. Scalia in pages 28~34, IEEE Volume 19, Issue 4, July-August 2005, Network. The abscissa in FIG. 3 indicates the number of 802.11 STAs (stations) and 802.11e QSTAs (stations with OoS) coexist in the network, and the ordinate in FIG. 3 indicates the corresponding throughput, wherein the value of CWmin is set to 31, and the value of CWmax is set to 1023. It can be observed from FIG. 3 that even though the contention windows of all the EDCA QSTAs are enlarged to the same as that of DCF, the 802.11e QSTAs have higher priorities compared to the 802.11 STAs in medium contention through the setting of AIFSN.

As shown in FIG. 2, the value of AIFSN of AC_VO and AC_VI is preset to 2. Referring to FIG. 3, it can be observed by comparing the throughputs of EDCA and DCF when the value of AIFSN is 2 that the 802.11e QSTAs have much higher chances of taking up the medium than the 802.11 STAs, and when the number of stations increases, the advantage for EDCA to contend for the medium is also multiplied and accordingly the throughput of all the DCF STAs is reduced.

Such service division could be acceptable if the packets transmitted by the 802.11 STAs are in a best effort traffic; however, if the 802.11 STA are also about to transmit voice or video packets having higher priorities, all the packets equally contend for the medium so as to obtain the transmission right with a access parameter set about the same as the best effort category because the MAC of DCF does not support access parameters of different categories, and which may cause unfairness to those packets having higher QoS requirement in the 802.11 STA. Since the packets having higher priorities of the 802.11 STA cannot obtain the access to the medium, the corresponding stations for transmitting these packets cannot provide the QoS as expected even though they are 802.11e QSTAs with QoS.

In foregoing reference article, the performance of EDCA in service differentiation is analyzed through simulative experiments, wherein it shows that the adjustment to AIFS has obviously better performance than the adjustment to the contention window in order to obtain better service differentiation performance, and meanwhile, the experimental result shows that the behaviors of a conventional 802.11 STA is very similar to that of the best effort category of an 802.11e QSTA, which also indicates the inferior performance in medium contention of the conventional 802.11 STA and the first two traffic categories having high priorities of the 802.11e QSTA in an coexistent environment thereof.

In the article "Performance Analysis of Priority Schemes for IEEE 802.11 and 802.11e Wireless LANs" by Yang Xiao, pages 1506~1515, in Wireless Communications, IEEE Transactions on Volume 4, Issue 4, July 2005, an analysis model adaptive to EDCA is provided, wherein it shows that the performance of EDCA in its throughput and QoS (including delay and packet loss rate) is closely related to the settings of its parameters.

In the article "Impact of frame size, number of stations and mobility on the throughput performance of IEEE 802.11e" by J. del Prado Pavon, S. N. Shankar in pages 789~795 of Wireless Communications and Networking Conference, 2004. WCNC. 2004 IEEE Volume 2, 21-25 Mar. 2004 Vol. 2, the effect of frame size to EDCA is explained with experimental results, and the experiment shows that the throughput performance of EDCA is less affected by bad link compared to the conventional DCF.

In some other articles, an admission control algorithm is provided regarding EDCA, wherein the QoS of packets having high priorities are maintained by managing the traffic of the entire network, or a mechanism regarding HCCA environment is provided, wherein the value of TXOP is set according to the actual transmission rate of packets in the physical layer so as to provide more efficient QoS, or the problem of radio resource sharing caused by QoS supporting basic service set (QBSS) working in the same band regarding EDCA environment is resolved.

SUMMARY OF THE INVENTION

Accordingly, the present invention is directed to a data transmission method for providing Quality of Service (QoS) support to conventional 802.11 stations in an 802.11e environment, wherein the QoS of the entire network is improved, and packets having instant requirements are fairly treated and provided with desired QoS.

The present invention provides a data transmission method suitable for a communication system. The communication system includes a plurality of first stations using an 802.11 protocol and a plurality of second stations using an 802.11e protocol with QoS support. The data transmission method includes using one of the second stations as a Contention AssisTance (CAT) station to obtain a medium access right with a first access category (AC). The CAT station broadcasts a CAT packet to all the first stations and the other second stations. The other second stations stops contending for the medium access right for a first predetermined time according to the CAT packet, and the first stations transmit a packet with QoS requirement according to the CAT packet.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 illustrates the infrastructure of the EDCA mechanism, the HCCA mechanism, and the conventional 802.11 MAC mechanisms DCF and PCF.

FIG. 2 illustrates the preset value of an EDCA parameter set.

DESCRIPTION OF THE EMBODIMENTS

Figure 3:
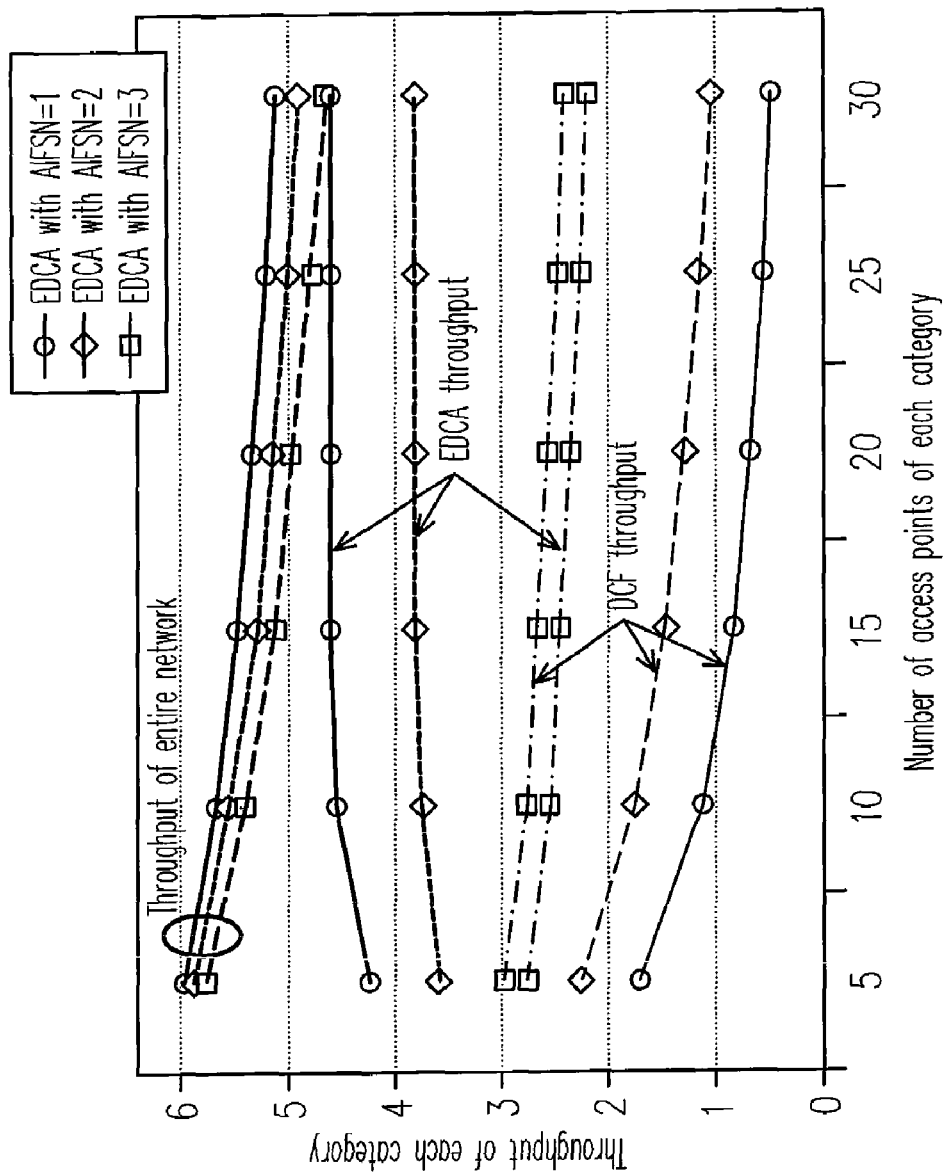
FIG. 3 is a diagram illustrating the throughputs corresponding to the numbers of 802.11 STA (stations) and 802.11e QSTA (stations with QoS) coexist in a network.

Reference will now be made in detail to the present preferred embodiments of the invention, examples of which are illustrated in the accompanying drawings. Wherever possible, the same reference numbers are used in the drawings and the description to refer to the same or like parts.

The present invention provides a medium access with Contention AssisTance (MACAT) protocol, wherein Quality of Service (QoS) support is provided to conventional 802.11 stations in an 802.11e environment. The present invention is directed to improve the QoS of an entire network so that those packets with instant requirements can be fairly treated and provided with desired QoS.

In the present invention, by expanding the medium access control (MAC) function of the 802.11 and 802.11e protocols, the QoS of an entire wireless network is improved so that the network resources will not be completely taken by users of 802.11e. The 802.11e standard is a MAC provided by the Institute of Electrical and Electronics Engineers (IEEE) for improving the QoS of wireless networks. Even though the 802.11e standard is compatible to the conventional 802.11 standard, but when the two coexist in a network, users of 802.11e have higher priority in medium contention than users of 802.11. When the network has only limited resources, users of 802.11e will take up almost all the network resources, especially when bidirectional communications between two different specifications are performed, such as Internet phone and video conference. The present invention provides a MACAT mechanism by expanding the MAC of 802.11 and 802.11e standards.

According to the MACAT mechanism provided by the present invention, an 802.11e QSTA (station) with QoS support serves as a medium contention assistant of 802.11 STA (stations) in some particular time to regularly broadcast a Contention AssisTance (CAT) packet so that those 802.11 STA which are about to transmit voice or video data can obtain a medium access right for transmitting the data and the desired QoS for users (especially users of 802.11 standard) having instant transmission requirements in the coexistent environment can be maintained.

Figure 4:
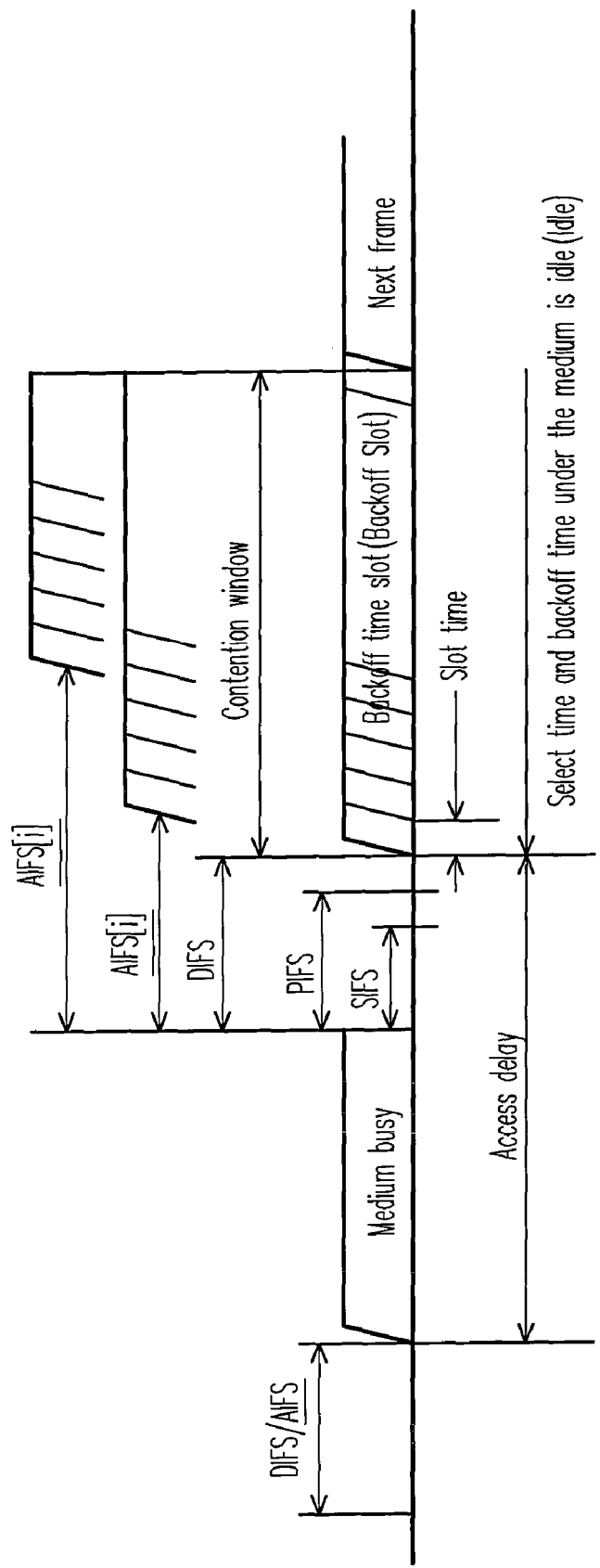
FIG. 4 is a diagram illustrating that an 802.11e QSTA with QoS and an 802.11 STA transmit packets after a DIFS time or an AIFS time, and a backoff time has to be further waited for if the medium is busy.

In the present invention, a design for expanding MAC in a wireless network which contains users of both 802.11 and 802.11e, namely, a medium access protocol with Contention AssisTance, is provided. As shown in FIG. 4, when an 802.11e QSTA with QoS support and an 802.11 STA are about to transmit packets, a distributed coordination function (DCF) inter-frame space (DIFS) or an arbitration inter-frame space (AIFS) has to be waited for. If the medium is busy, a backoff time is further waited for. The packet having higher priority of the 802.11e QSTA has higher possibility to gain the medium access right than the conventional 802.11 STA for it has shorter average backoff time. Even though the packet to be transmitted by the 802.11 STA is a packet with high QoS requirement, it cannot contend with the 802.11e QSTA equally due to the restriction of DIFS and contention window of the conventional 802.11 MAC. Thereby, the present invention provides the new MAC access mechanism MACAT for resolving this problem.

According to MACAT, the 802.11e QSTA serves as a medium contention assistant for assisting the packets having high QoS requirement in the conventional 802.11 STA at particular time, and which allows the 802.11 STA and the 802.11e QSTA which instantly transmit packets to each other to obtain the desired QoS without losing the QoS of the 802.11e QSTA, so that the QoS of the entire network can be improved. If in the future, the 802.11e QSTA implemented with foregoing method transmit data to the 802.11 STA instantly, the QoS thereof can be maintained by other 802.11e QSTA implemented with the method.

802.11e

Two MAC access methods are specified in the 802.11e standard, wherein one is enhanced distributed channel access (EDCA) mechanism, and the other one is centralized hybrid coordination function (HCF) controlled channel access (HCCA) mechanism. These two new access methods enhance the original DCF and PCF access methods of 802.11a/b/g.

The EDCA mechanism may also be referred as a parameterized DCF, and in order to provide QoS of different priorities, four different access categories (AC) are brought into 802.11e. These four AC are respectively voice, video, best effort, and background, and each AC has its own transmission queue and an access parameter set. The priorities of these AC are distinguished by adjusting the parameters thereof, and these parameters are as following:

Arbitrary inter-frame space time (AIFSN): the minimum duration for the medium to stay idle before backoff. The smaller AIFSN is, the higher the priority is.

Contention window (CW, including CWmin and CWmax): the backoff mechanism needs to select a number randomly from the contention window CW for calculating the time required by the backoff, CWmin is the preset minimum value of CW, and CWmax is the maximum value of CW in the DCF exponential backoff mechanism. The smaller CW is, the more likely the randomly selected backoff time has the minimum value, namely, the medium is accessed after a shorter idle time.

Transmission opportunity (TXOP): when a node successfully obtains the access right to the medium, the packets are transmitted back and forth at intervals of only short IFS. TXOP is the upper time limit therein. Namely, during the time of TXOP, the node can directly transmit data without contending for the medium with other nodes.

When a data is transmitted from an upper layer to the MAC layer, the data is placed into the transmission queue of the AC of the data, and the packets of which AC can access the medium according to the preset access set thereof is determined by a virtual collision handler. Through such a mechanism, those packets having higher priority can successfully obtain the access right to the medium.

A centralized polling mechanism is provided by HCCA, wherein the guaranteed medium access right is assigned according to the traffic flow. A wireless access point (AP) inquires each QSTA whether it has packet to transmit in the order of a polling list during each service interval (SI). After receiving a requirement response from a QSTA, the TXOP to be assigned to the QSTA is calculated by bringing the responded parameters into a scheduling algorithm.

Since HCCA is optional in 802.11e, it is assumed below that the 802.11e STA executes only EDCA.

Requirement of an Environment Wherein 802.11 and 802.11e Coexist

The IEEE established the 802.11e in 2005, and related products are brought into the market in 2006 under the affection of the WiFi alliance. It is estimated that in the near future, a wireless network environment wherein the 802.11e QSTA and the conventional 802.11 STA coexist will be formed. Since 802.11e QSTA has advantage in medium contention of voice and video categories, those voice and video packets having the same strict time requirement in the conventional 802.11 STA may not be able to gain the medium access right due to its disadvantageous contention parameters, so that the conventional 802.11 STA may not be able to obtain the desired QoS. In other words, packets of the same categories are treated unequally, and starvation may be caused when the network resources are limited.

Figure 5:
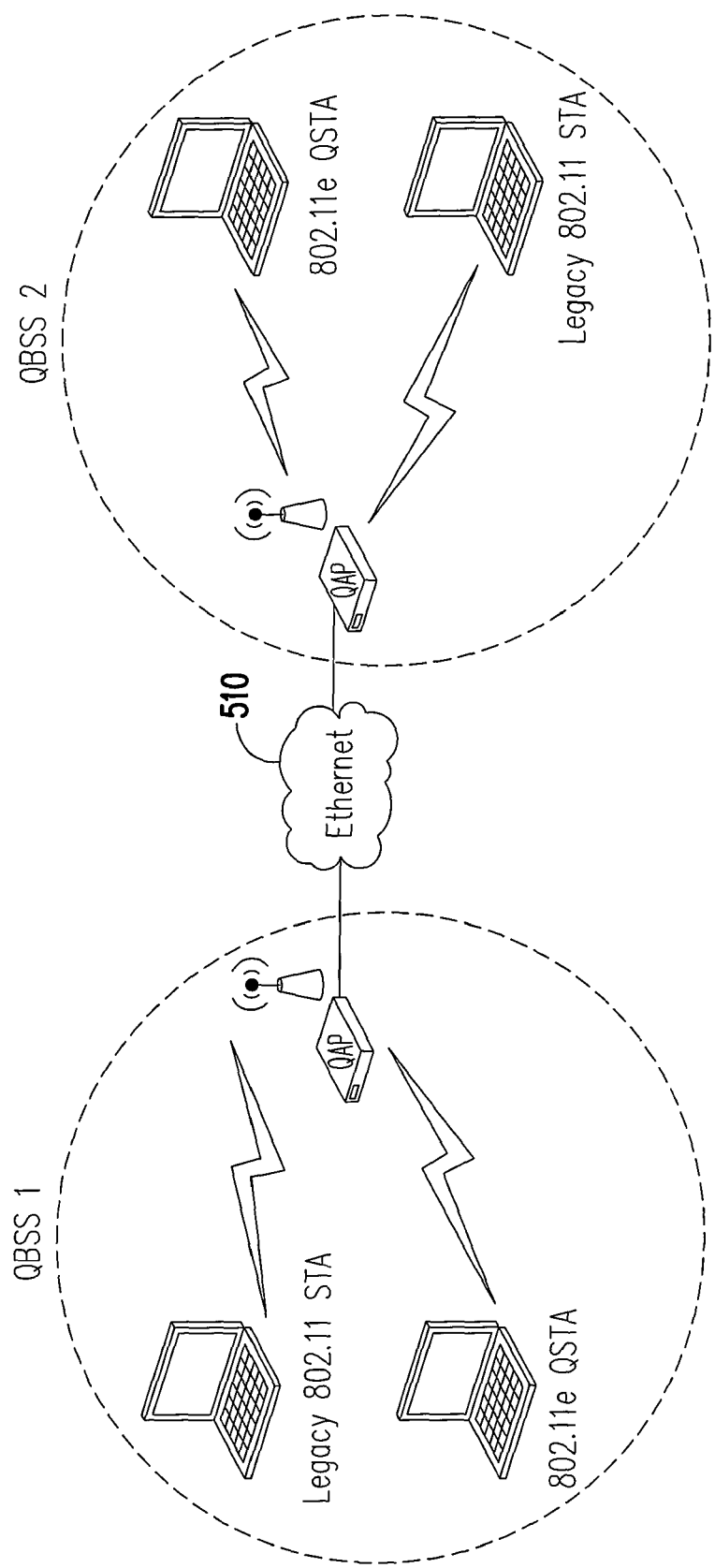
FIG. 5 is a diagram illustrating the connections between different QBSS through a backbone network.

Because of the establishment of the 802.11e standard, today's wireless AP devices are all equipped with the 802.11e standard, and the expansion of QoS AP (QAP) has become the trend. Besides, QAP are promoted with prices very close to those of the conventional AP. Accordingly, a future network formed by many QoS supporting basic service sets (QBSS) and many conventional basic service sets (BSS) can be expected. Additionally, local wireless networks which are newly set up will be mostly formed by QBSS, so as to generate the network structure described in the present disclosure. Different QBSS are connected to each other through backbone network. As shown in FIG. 5, the QBSS 1 and the QBSS 2 are connected to each other through an Ethernet network 510. 802.11 STA and 802.11e QSTA may coexist in some particular QBSS. As shown in FIG. 5, the stations STA and QSTA in the QBSS 1 and QBSS 2 coexist in the network.

The backbone network is not likely to become bottleneck when the nodes under these QBSS transmit data instantly. However, if a particular node under any one of the QBSS cannot obtain the medium access right for transmitting packets, the node becomes a transmission obstacle and which may cause the two parties of the communication to be unsatisfied to the QoS of the network. For example, if an 802.11e QSTA under the QBSS 1 wants to use an Internet phone application with an 802.11 STA under the QBSS 2 but at the same time, the 802.11e STA under the QBSS 2 wants to share a video/audio with an 802.11 STA under the QBSS 1, the media of the two QBSS may be completely taken by the 802.11e QSTA when the network has only limited resources. Accordingly, the QoS of the 802.11 STA may be affected, and the QoS received by the 02.11e QSTA which communicates with the QoS of the 802.11 STA is indirectly affected. Moreover, the QoS of the entire network is also affected, which causes both the 802.11 STA and the 802.11e QSTA under the QBSS 1 and the QBSS 2 to be unsatisfied by the QoS.

In order to resolve the less-efficient service differentiation caused by unfairness in a coexistent environment of 802.11 STA and 802.11e STA, the present invention provides a revised MAC for 802.11 and 802.11e standards and accordingly generates a new medium access with Contention Assis-Tance (MACAT) protocol.

MACAT Protocol Adaptive to Coexistent Environment

The present invention provides a MACAT protocol, wherein existing 802.11e devices are adopted for assisting 802.11 devices to improve the QoS of the two.

Figure 6:
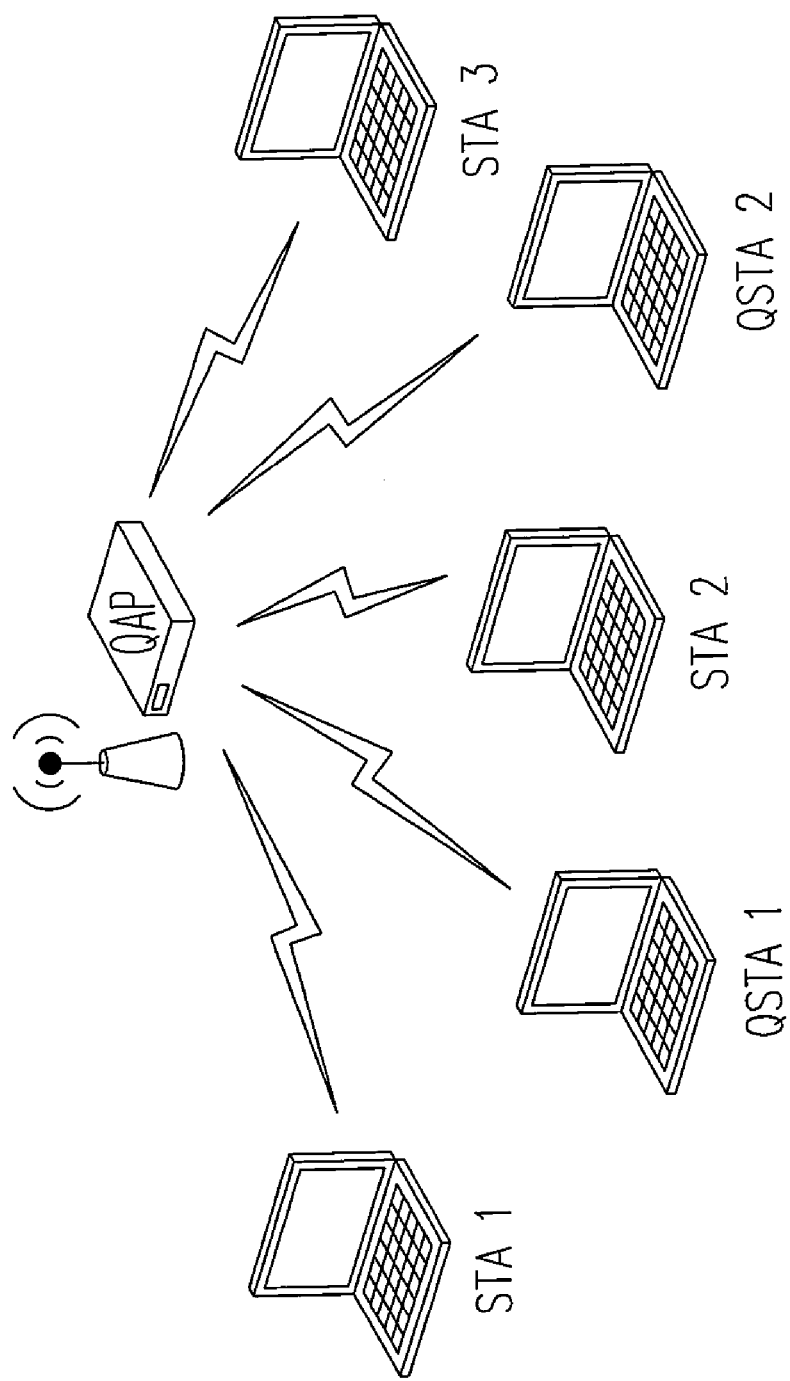
FIG. 6 is a diagram illustrating the connections of a network having both 802.11 devices and 802.11e devices.
Figure 7:
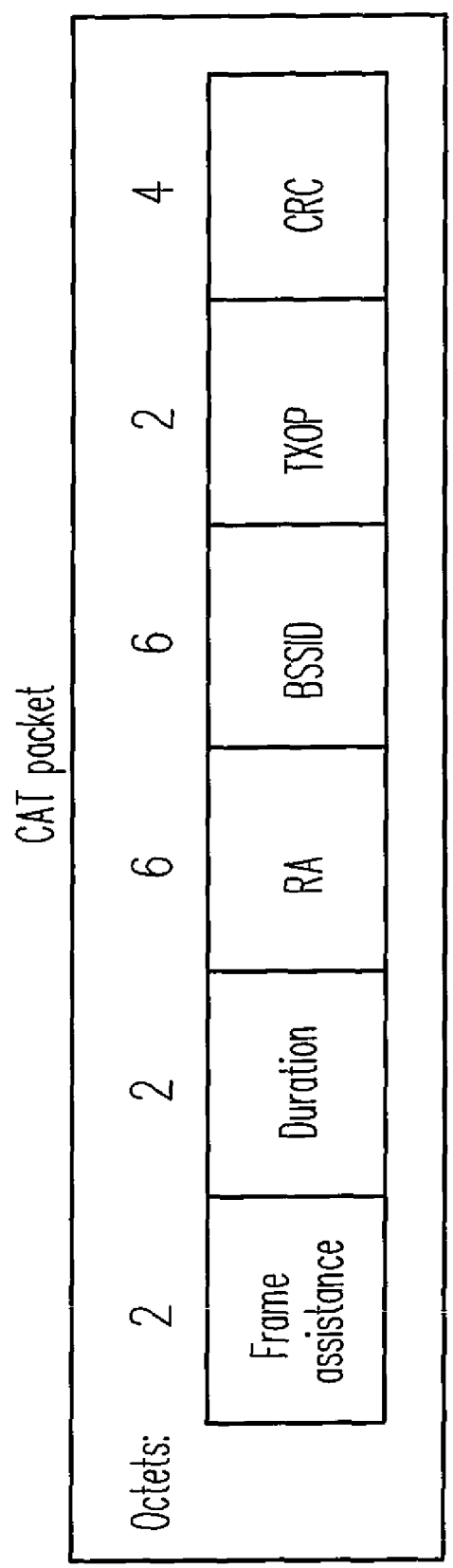
FIG. 7 is a diagram illustrating the contents of fields regarding a CAT packet in the medium access with Contention AssisTance (MACAT) protocol provided by the present invention according to an embodiment of the present invention.

When a network contains both 802.11 devices and 802.11e devices (as shown in FIG. 6), the MACAT protocol allows an 802.11e station QSTA to obtain the medium access right with the contention parameter set of voice AC AC1 at particular intervals. After obtaining the medium access right, the 802.11e station QSTA broadcasts a CAT packet (as shown in FIG. 7). When an 802.11 station STA receives the CAT packet, the 802.11 station STA transmits voice and video data so that those packets having high QoS requirement in the 802.11 STA can be transmitted as soon as possible in an unfavourable environment.

The fields in the CAT packet illustrated in FIG. 7 will be described in detail herein. The contents of the type and sub-type fields in the frame control field are respectively 01 and 0000, and the TXOP field contains the TXOP of the QSTA AC1 who is currently serving as a contention assistant. TXOP means that after a node has successfully obtained the medium access right, packets are transmitted back and forth at intervals of a short IFS (SIFS) time. Besides, TXOP is the upper time limit for intervals of such data transmission. In other words, the node can directly transmit data without having to contend for the medium again during this TXOP time. After other QSTA receive the CAT packet, the other QSTA read the value of the TXOP (which is a value defined in the communication standard protocol) so that there will be no other QSTA contending for the transmission channel during this period.

Figure 8:
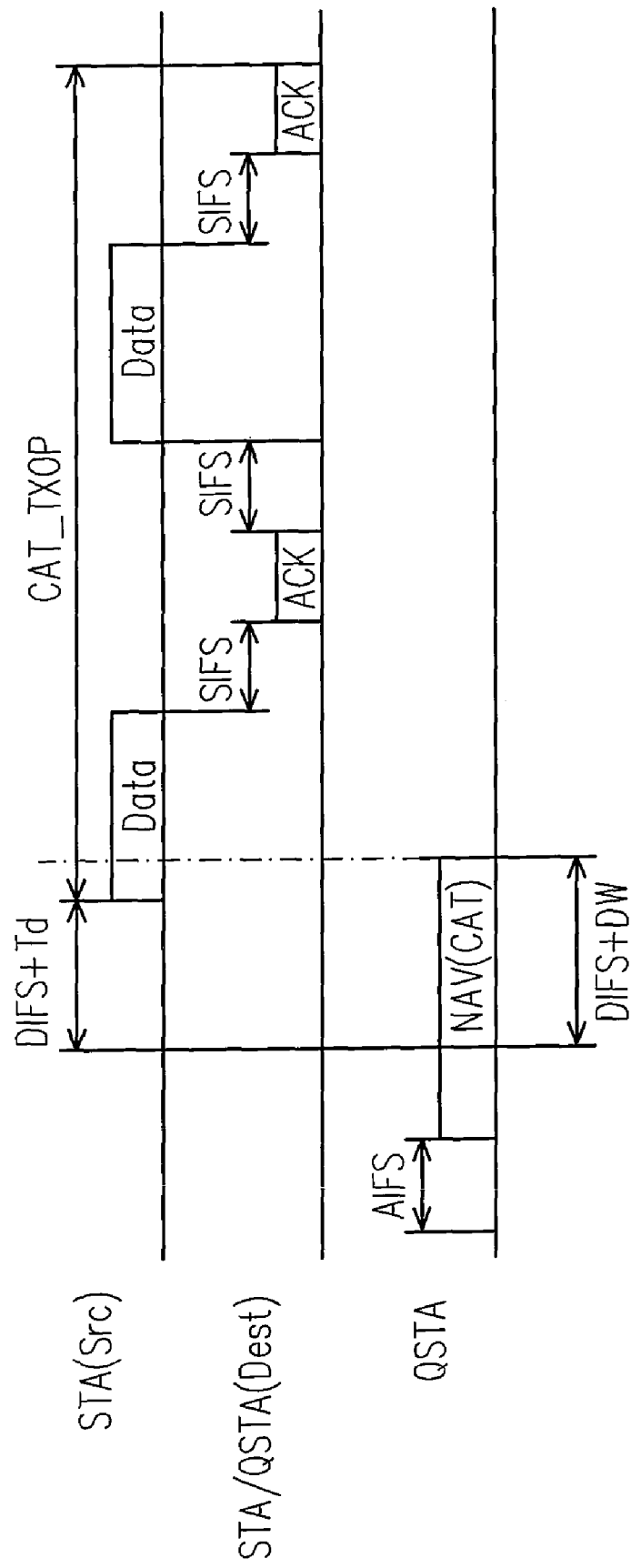
FIG. 8 illustrates the operation of the MACAT protocol provided by the present invention.

FIG. 8 illustrates the operation of the MACAT protocol. As described above, a QAP is a QoS station and which may be a wireless station supporting 802.11e QoS. After a QSTA with QoS is connected to the QAP, a CAT timer thereof is then determined. A timeout is given after the timer's countdown, and then the QSTA contends for the medium with the contention parameter set of AC1. After the QSTA obtains the medium successfully, a CAT packet is broadcasted, after receiving the CAT packet, the other QSTA under the same QBSS stops contending for the medium for a DIFS and deferring window (DW) time so that all the 802.11 STA under the same QBSS which have received the CAT packet can equally contend for the medium access right for transmitting voice and video data in the environment having QSTA.

Collision may be caused if more than two 802.11 STA contend for the medium so as to transmit voice and video data. In order to avoid collision and accordingly waste of the CAT packet, all the 802.11 STA which have received the CAT packet randomly generate a deferring time Td during the period of the deferring window DW. The 802.11 STA can only access the medium after it detects a medium idle time including the DIFS time and the deferring time Td. The 802.11 STA which gains the medium access right can transmit voice and video data at intervals of two SIFS with a acknowledgement signal ACK during the TXOP time according to the CAT packet, namely, in the pattern of SIFS→ACK→SIFS.

Figure 9:
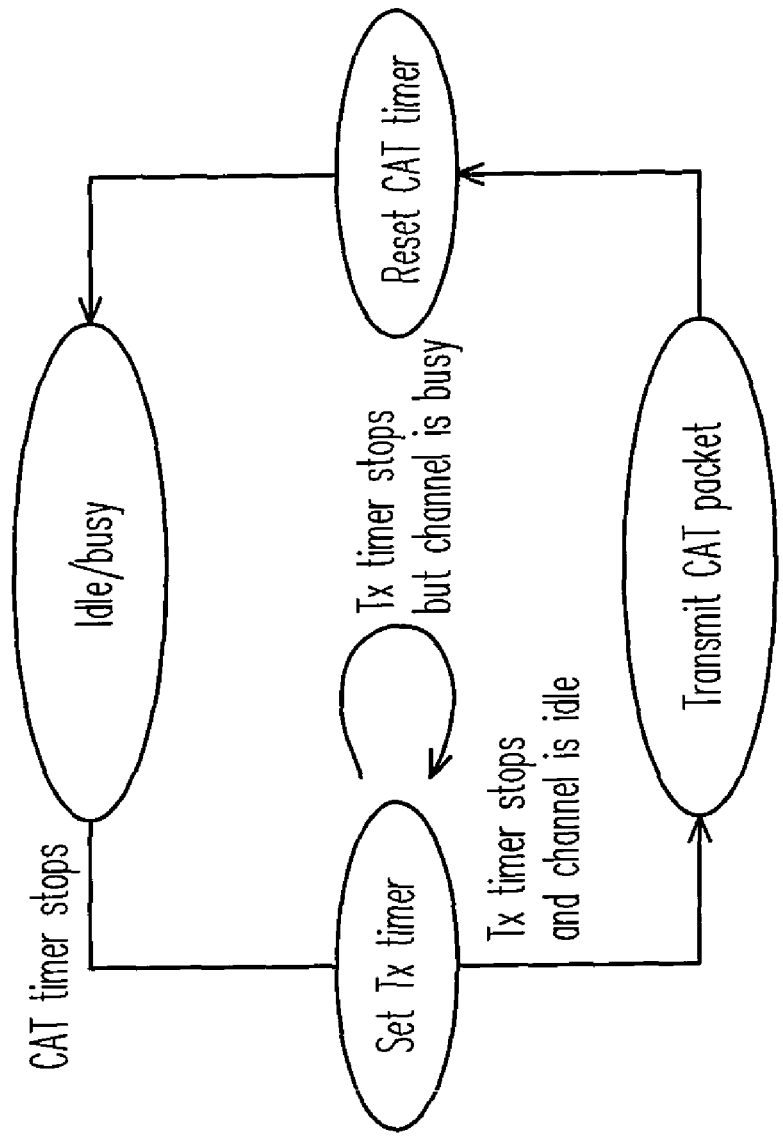
FIG. 9 is a flowchart illustrating the transmission of a CAT packet.

FIG. 9 is a flowchart illustrating the transmission of a CAT packet. A QSTA has a CAT timer. When the CAT timer gives a timeout, the QSTA tries to obtain the medium with the contention parameter set of AC1 for broadcasting the CAT packet. While is CAT packet is transmitted, the network allocation vector (NAV) is set to DIFS+DW, the CAT_TXOP is set to the TXOP of AC1 of the QSTA. After the CAT packet is transmitted, the QSTA resets the CAT timer to get ready for the next CAT transmission.

The deferring window DW is set for preventing collision caused when multiple 802.11 STA receive the CAT packet and start to transmit data at the same time, which not only loses the transmission opportunity but also wastes the network resources such as the bandwidth for transmitting the CAT packet. Each 802.11 STA has to randomly select a deferring time Td in the DW and then waits for a DIFS to detect whether the medium is idle in order to avoid collision.

Additionally, the NAV is set to DIFS+DW in order to ensure that during this period, all the other QSTA cannot contend for the medium with the 802.11 STA, so that the 802.11 STA can have the chance for transmitting the voice or video data and accordingly starvation can be avoided. Moreover, the entire network can provide fair QoS through the assistance of the QSTA.

Figure 10:
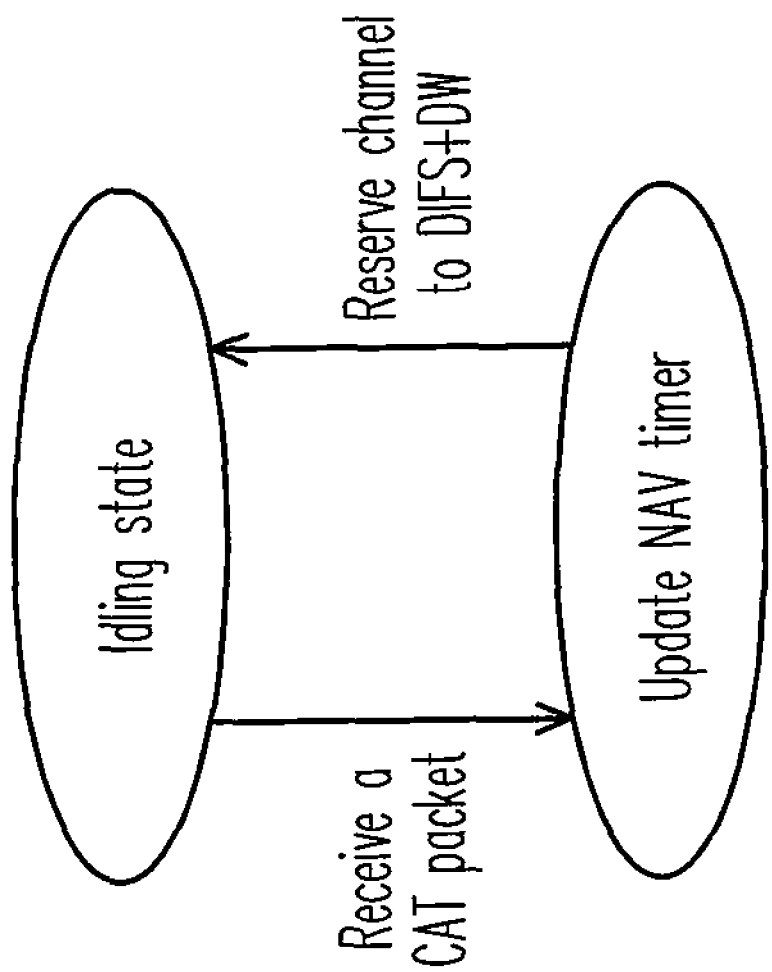
FIG. 10 is a diagram illustrating the MACAT protocol state when an QSTA is used as a receiving node of a CAT packet.

FIG. 10 is a diagram illustrating the MACAT protocol state when an OSTA is used as a receiving node of a CAT packet. When the QSTA receives a CAT packet when it is idle, the QSTA sets the NAV timer thereof according to the duration contained in the received CAT packet, so as to keep the medium access right for the 802.11 STA.

Figure 11:
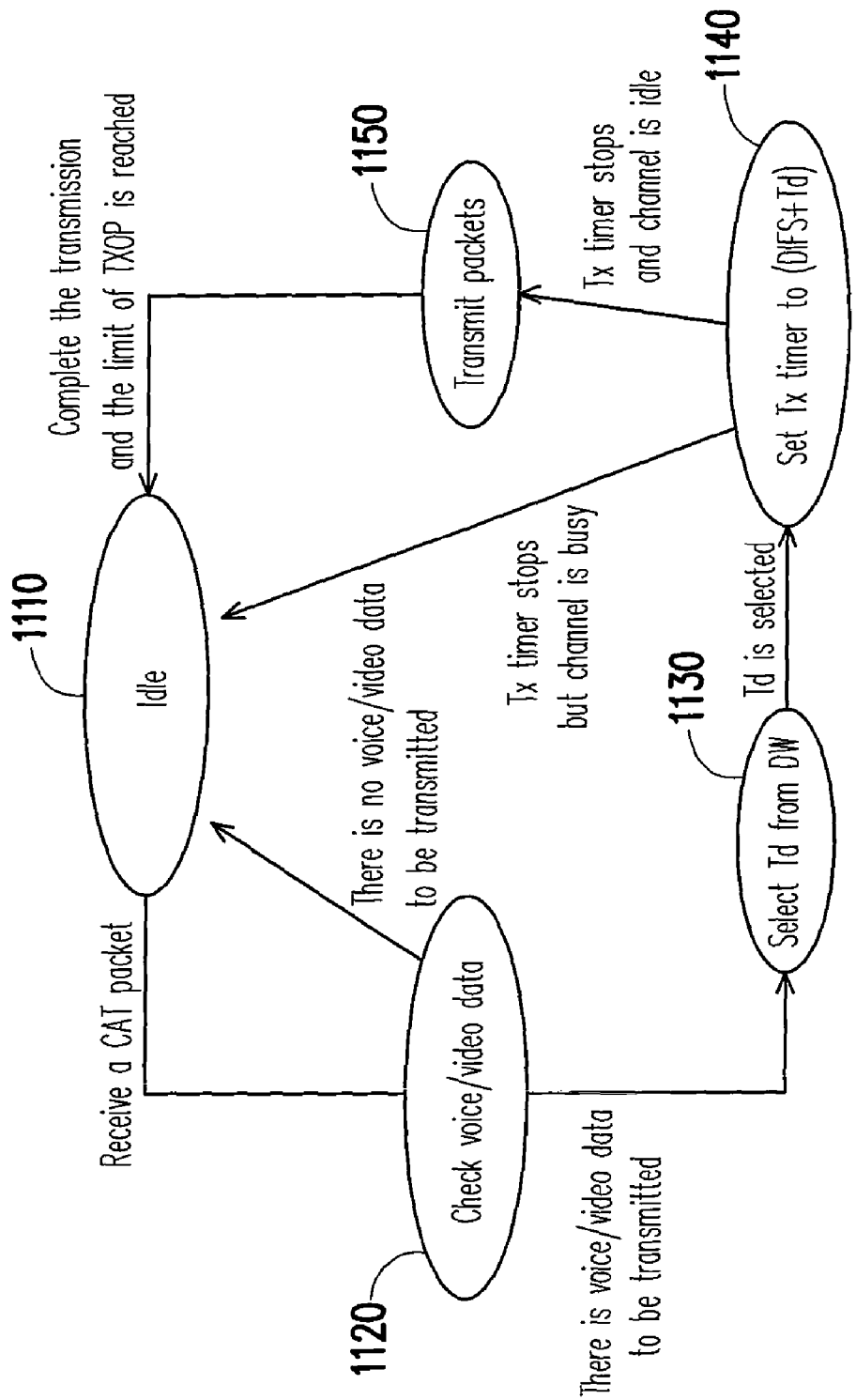
FIG. 11 is a diagram illustrating the MACAT protocol state when an 802.11 STA is used as a receiving node of a CAT packet.

FIG. 11 is a diagram illustrating the MACAT protocol state when an 802.11 STA is used as a receiving node of a CAT packet. When all the 802.11 STA receive the CAT packet, the 802.11 STA can equally contend for the medium access right for transmitting voice or video packet when the other QSTA are not contending for the medium through the NAV. For example, a CAT packet is received in an idling state 1110. Next, in step 1120, whether there is voice or video packet to be transmitted is detected. If there is packet to be transmitted, step 1130 is executed to select a deferring time Td from the deferring window DW. If there is no packet to be transmitted, the process returns to the idling state. After selecting the deferring time Td, the timer of the transmission device is set to (DIFS+Td), as in step 1140. When the Td timer stops but the channel is still busy, the process returns to the idling state 1110. However, if the Td timer stops but the channel is in the idling state, packets are then transmitted, as shown in step 1150. After the packets are transmitted and the limit of TXOP is reached, the process returns to the idling state 1110. Through the method described above, the 802.11 STA can have the opportunity for obtaining the medium access right in an environment with QSTA so that STA starvation can be avoided.

Usually an 802.11 STA tries to access the medium after detecting a DIFS medium idling time. However, according to the MACAT protocol, all the 802.11 STA which have received the CAT packet randomly select a deferring time Td from the deferring window so as to reduce the possibility of failure of the MACAT protocol caused by collisions. After that, the 802.11 STA detects a period of DIFS and Td of the medium. If the medium is always idle during this period, the 802.11 STA tries to access the medium. After successfully obtaining the medium access right, the 802.11 STA transmits packets within a predetermined CAT_TXOP time at intervals of two SIFS with an acknowledgement signal ACK. IF the transmission fails, the 802.11 STA then contends for the medium again or wait for the next opportunity for receiving the CAT packet.

How the MACAT protocol provided by the present invention operates in stations of different roles has been described above, wherein a CAT timer has to be maintained in the QSTA, and QSTA transmits the CAT packet according to the timeout of the timer. The CAT timer adopted here gives timeout at a particular CAT interval to notify the QSTA to transmit the CAT packet. However, in order to avoid collision of CAT packet, the setting of the CAT timer has to be adjusted by receiving CAT packets from other QSTA, which will be described in detail herein.

Since each QSTA transmit CAT packets at the same CAT intervals, the CAT packets transmitted may continuously collide and accordingly cannot be successfully received by other stations if there are more than two QSTA set their CAT timers at the same time or at different times which are a multiple of the CAT interval apart. In addition, sometimes some QSTA set the time for transmitting the CAT packets at very close time so that several CAT packets are continuously transmitted, which may cause two situations: first, only one of the CAT packets can capture the channel and be successfully received to improve the QoS, while the other CAT packets are all wasted; second, collision is caused and all the CAT packets are wasted.

An adaptive interval method is provided herein. A CAT timer in a QSTA records the CAT Interval at the beginning. However, after each QSTA receives the CAT packet from the other QSTA, the QSTA compares the transmission frequencies of itself and the other QSTA to find out whether the CAT packets are transmitted too closely and to adjust the next CAT transmission time, so that the problem of close transmission time can be avoided. In addition, every time after the QSTA transmits a CAT packet, the QSTA adjusts the CAT interval for transmitting the next CAT packet, so that those QSTA which start to transmit CAT packets at the same time can stagger the transmission time thereof with those of the other QSTA by detecting the CAT packets transmitted by other QSTA after transmitting a certain number of CAT packets. The process will be described as following.

Past interval (PI): the QSTA uses PI for measuring the frequency difference of itself and other QSTA for transmitting CAT packets.

lastSendCATtime: the last time the QSTA transmits a CAT packet.

recvCATTime: the time for the QSTA to receive CAT packets from other QSTA.

$\alpha$ is a threshold used for determining whether the transmission frequencies are close to each other, wherein if the time difference for any two QSTA to transmit CAT packets is smaller than $\alpha$, it is determined that the transmission times are too close to each other and should be adjusted.

When a CAT packet is received,

PI=recvCATtime−lastSendCATtime mod CAT_Interval (CI)

If ((PI<$\alpha$) or (PI>(1−$\alpha$))

Adaptive interval (AI)=$\alpha$+[any random number within (CI−2$\alpha$)]

CAT timer=AI.

After a CAT frame is transmitted:

AI=(CI−$\alpha$)+[any random number within 2$\alpha$]

CAT timer=AI.

Simulation of Performance of MACAT Protocol

Figure 12:
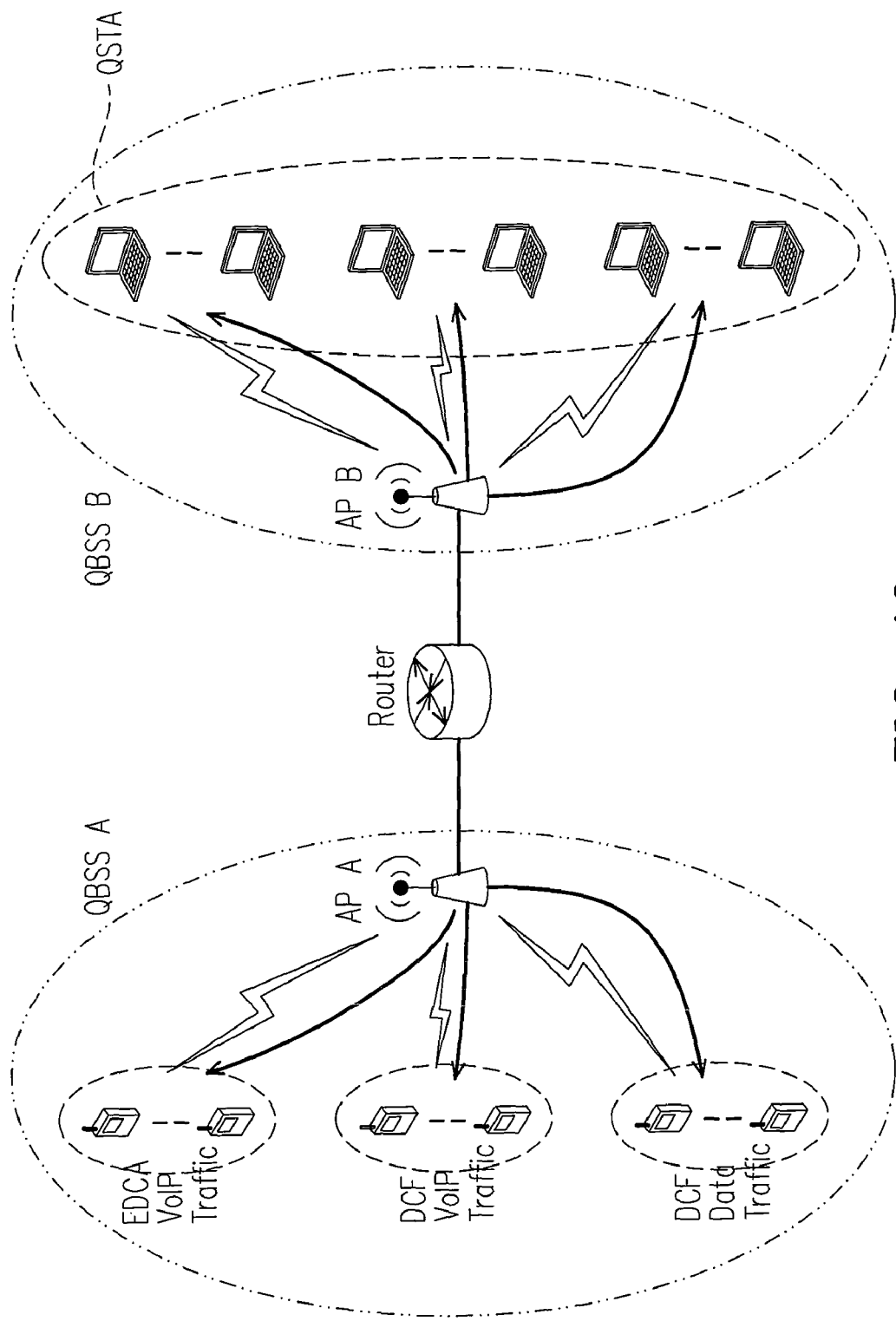
FIG. 12 illustrates a network structure for validating the performance of MACAT protocol.

The performance of MACAT protocol is validated by using the network structure illustrated in FIG. 12. There are two wireless AP A and B in the network. There are three ongoing sessions within the service range of the wireless AP A, which include a VoIP session running on an 802.11e QSTA EDCA, a VoIP session running on an 802.11 STA DCF, and a best effort data session running on an 802.11 STA DCF. The service range of the wireless AP B contains all 802.11e QSTA serving as receiving ends. Foregoing network structure is used as a simulation environment, and data is transmitted with predetermined parameters on a network simulator (NS) 2. The simulated end-to-end delay, transmission bit rate, and packet loss rate are measured at the receiving ends of the wireless AP B, and these results of MACAT are compared with the results of a general MAC.

The simulative conditions and parameter settings are as following:

Traffic Load:

VoIP session: simulating the VoIP session by using an exponential ON-OFF module, wherein the average time in the ON state (i.e. the time for transmitting packets with constant bit rate (CBR) is 100 ms, the average time in the OFF is 1350 ms, and the time distribution function of the ON and OFF state conforms to an exponential function. When it is in the ON state, the packet transmitted each time is 160 bytes, and the average transmission rate is 64 Kb/s.

Best effort data session: simulating the best effort data session by using a Pareto ON-OFF module, wherein the average time in the ON state (i.e. the time for transmitting packets with CBR) is 100 ms, and the average time in the OFF state is 10 ms, and the time distribution function of the ON and OFF state conforms to a Pareto. When it is in the ON state, the packet transmitted each time is 1500 bytes, and the average transmission rate is 200 Kb/s, and the shape parameter of the Pareto module is set to 1.5.

Simulation time: 1200 seconds.

Interval for transmitting CAT packets: 0.7 second.

$\alpha$: 0.3 ms.

data transmission rate: 11 Mbps.

basic transmission rate: 1 Mbps.

preamble length: 144 bits.

PLCP header length: 48 bits.

FIGS. 13~16 illustrate the simulation results, and it should be noted that some simulation results look alike for the performances are very close. "EDCA" represents a VoIP session running on the original 802.11e EDCA MAC, "DCF" represents a VoIP session running on the original 802.11 DCF MAC, "EDCA—our scheme" represents a VoIP session running on the 802.11e EDCA MACAT, and "DCF—our scheme" represents a VoIP session running on the 802.11 DCF MACAT. "Data" represents a best effort session running on the DCF, and "data—our scheme" represents the affection received by a best effort session which runs on the DCF in a MACAT environment.

In following experiments, the total number of data sessions is set to 14, and the total numbers of VoIP sessions running on the EDCA and the DCF are increased together from 12 to 16. The outputs of bit rate, packet drop rate, and end-to-end delay are observed.

Figure 13:
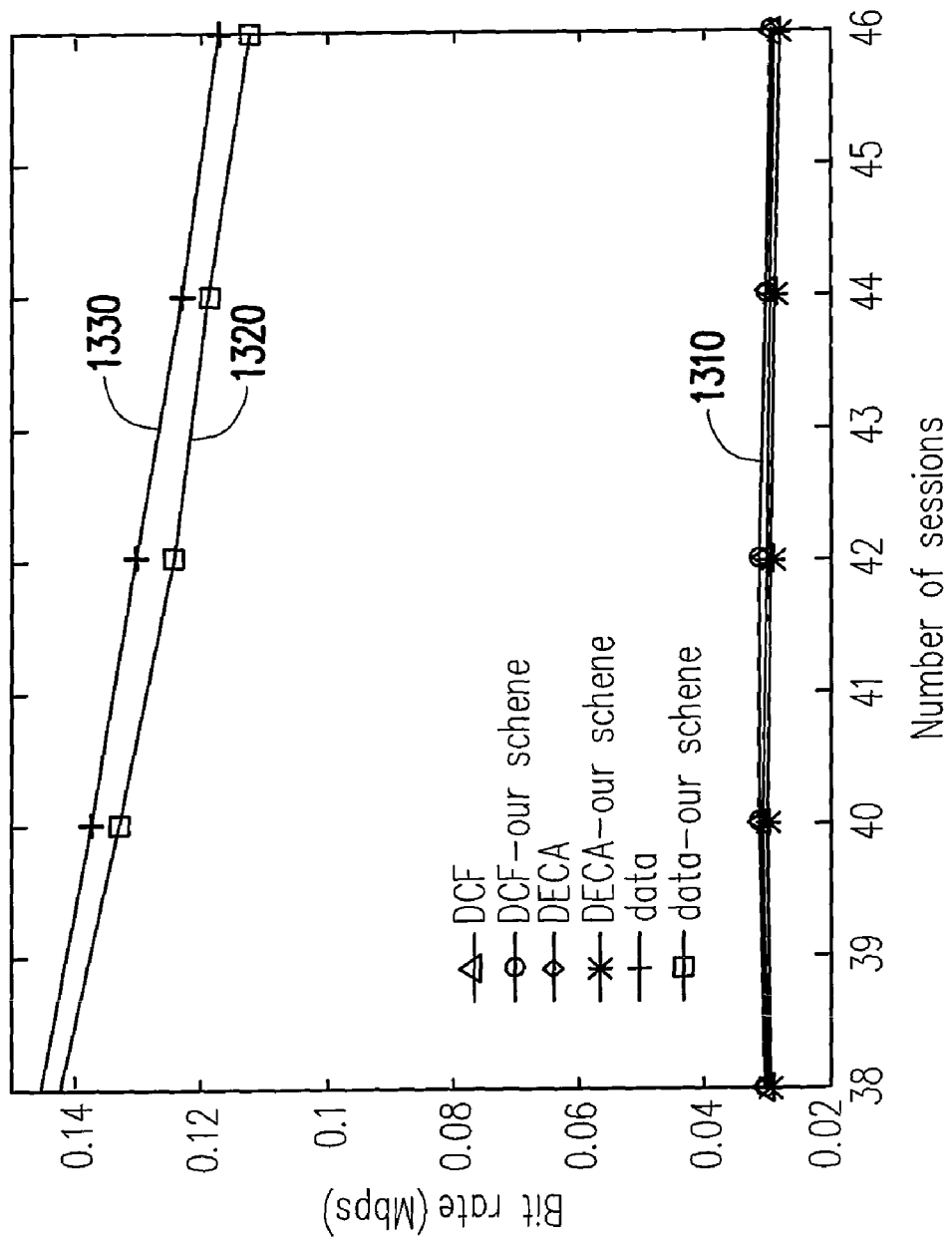
FIGS. 13~16 are diagrams illustrating the results of validating the performance of MACAT protocol based on the network structure in FIG. 12.
Figure 14:
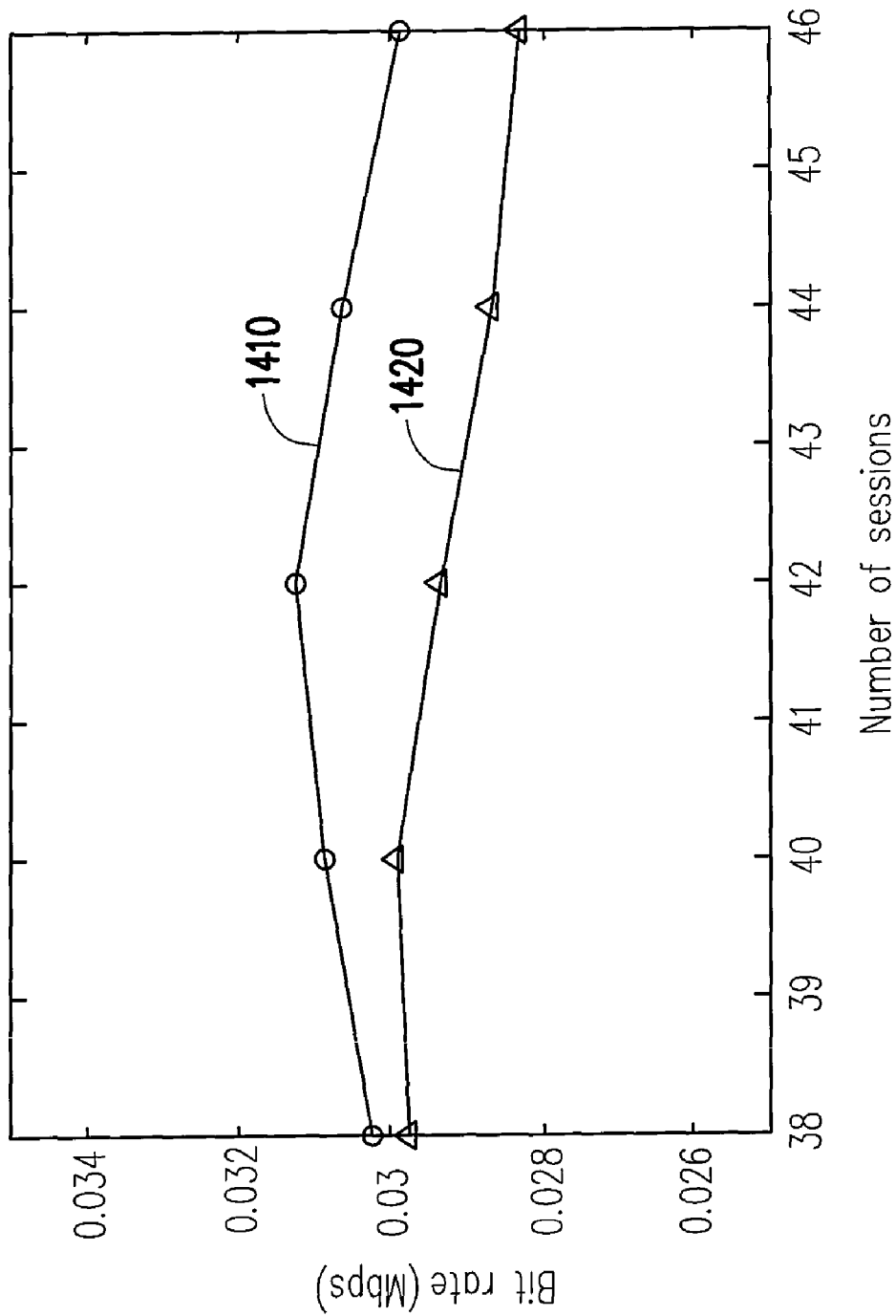

The ordinates (bit rate) in FIG. 13 and FIG. 14 indicate the average throughput of each session during the simulation time, and the abscissas thereof indicate the total number of three sessions, wherein the total number of data sessions is set to 14, and the total numbers of the two types of VoIP sessions respectively take half of the rest. It can be observed from the simulation results that when the total number of sessions increases, the bit rate of EDCA VoIP session running on the original MAC or the MACAT remains at a very similar rate to the packet output rate thereof, as the curving portions indicated by reference numeral 1310. While the performances of the DCF data sessions will decrease along with the increase in the total number thereof, as indicated by the reference numerals 1330 and 1420. While running on the MACAT protocol, the bit rate of the data sessions decreases even further, as indicated by the reference numerals 1320 and 1410. This is because the CAT packets deprive the resources of the best effort data sessions to provide the QoS desired by the DCF VoIP sessions.

Figure 15:
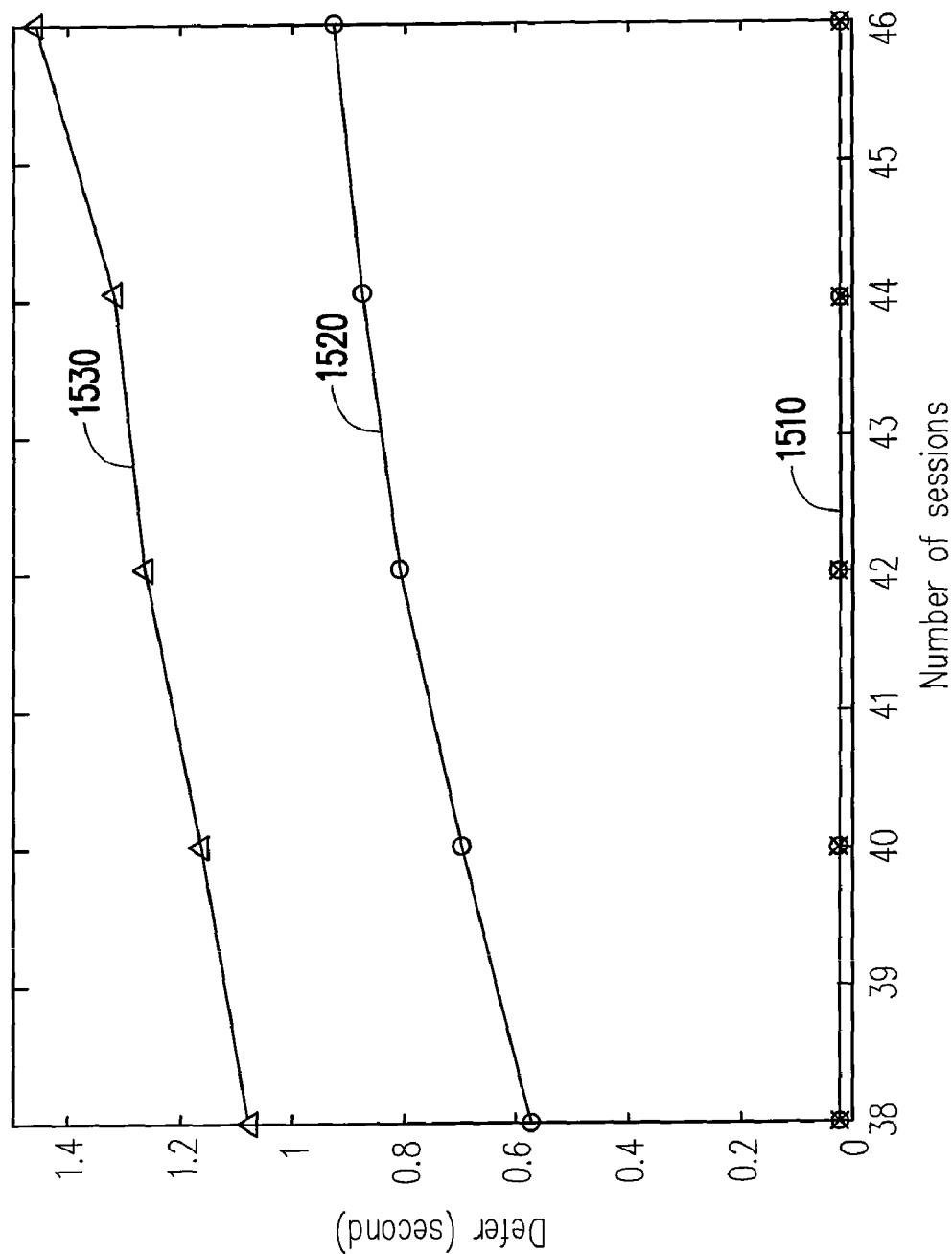
Figure 16:
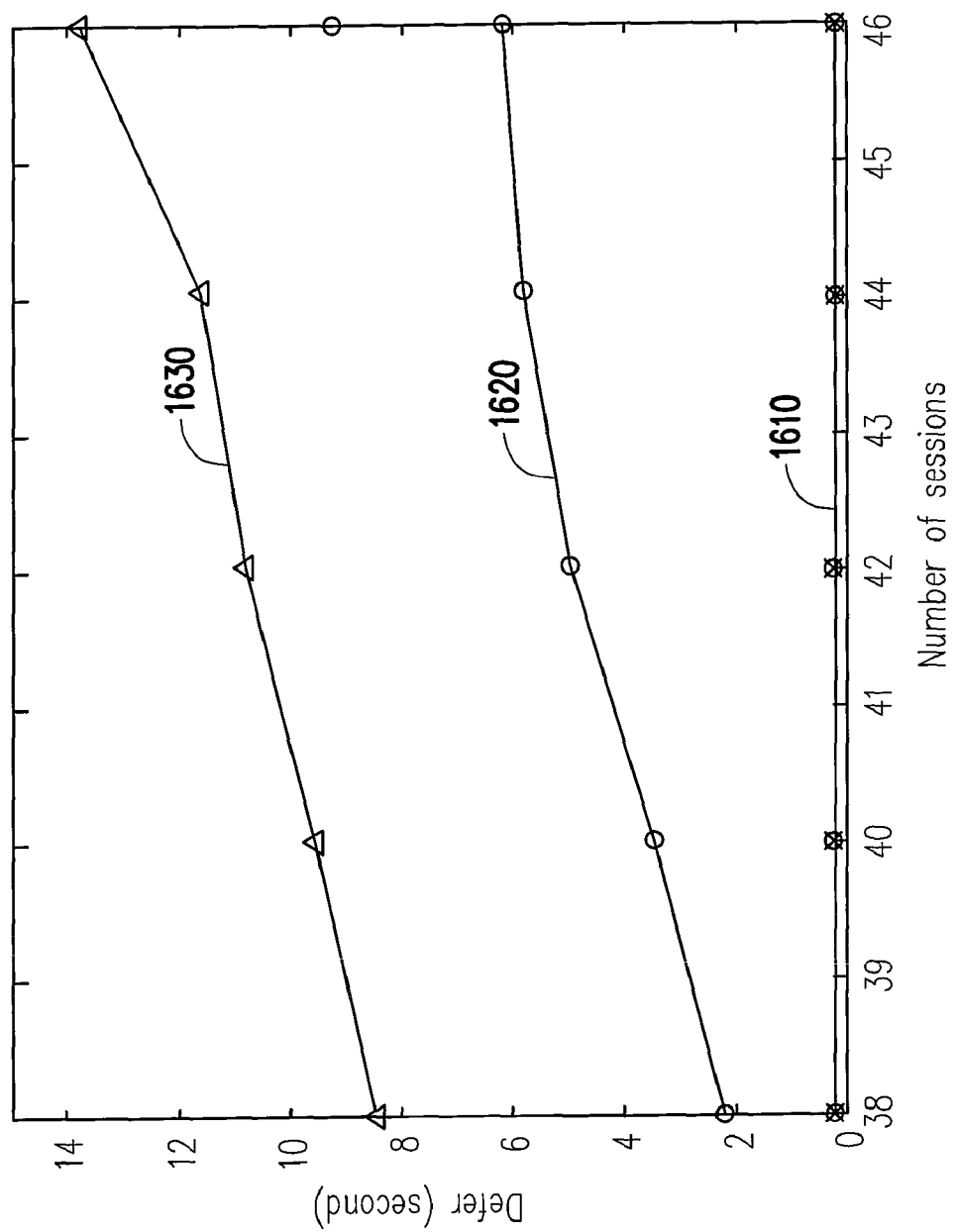

It can be understood from FIG. 15 and FIG. 16 that the DCF VoIP sessions can use the resources of the best-effort traffic through the assistance of the CAT so that the packet loss rate and end-to-end delay of the DCF VoIP session can be greatly reduced without losing the QoS of the EDCA VoIP sessions and accordingly the QoS of the entire network can be improved.

According to foregoing experiments, the MACAT mechanism provided by the present invention can considerably improve the performance of DCF without affecting the performance of the EDCA, and accordingly, a good communication quality can be obtained at both parties.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission method, suitable for a communication system, wherein the communication system comprises a plurality of first stations which uses an 802.11 protocol and a plurality of second stations which uses an 802.11e protocol and supports Quality of Service (QoS), the data transmission method comprising:
   using one of the second stations as a Contention AssisTance (CAT) station to obtain a medium access right with a first access category (AC), wherein the method of using one of the second stations as the CAT station comprises voluntarily issuing the first AC after counting a second predetermined time by using a CAT timer in the second stations connected to a QoS access point (QAP) which uses the 802.11e protocol and supports QoS, and obtaining the medium access right by using one of the second stations connected to the QAP; and
   broadcasting a CAT packet to all the first stations and the other second stations, wherein the other second stations stop contending for the medium access right for a first predetermined time according to the CAT packet, and the first stations transmit a packet with a QoS requirement according to the CAT packet.

2. The data transmission method according to claim 1, wherein the CAT packet comprises a transmission opportunity (TXOP) field for specifying a time interval in which the first stations start the packet with the QoS requirement according to the CAT packet.

3. The data transmission method according to claim 1, wherein the CAT packet comprises a duration field, and the other second stations determine the first predetermined time according to the content of the duration field.

4. The data transmission method according to claim 1, wherein the first predetermined time is the sum of a distribute coordination function (DCF) inter-frame space (DIFS) time and a deferring window time.

5. The data transmission method according to claim 1, wherein the CAT timer in the second station gives timeout at every CAT interval to notify the second station to transmit the CAT packet, and the CAT timer adjusts the CAT interval by receiving CAT packets from the other second stations in order to avoid collision.

6. The data transmission method according to claim 5, wherein the CAT interval is adjusted through an adaptive interval method, and the adaptive interval method comprises adjusting the CAT interval according to the transmission frequency of the other second stations.

7. The data transmission method according to claim 1, wherein the packet with the QoS requirement is to transmit voice or video data.

8. The data transmission method according to claim 1, wherein the first stations randomly generate a deferring time within a deferring window according to the CAT packet, and the first stations detect a DIFS and the randomly generated deferring time to obtain the medium access right.

9. The data transmission method according to claim 8, wherein the CAT packet comprises a TXOP field for specifying a time interval in which the first stations start the packet with the QoS requirement according to the CAT packet, and the first stations transmit the packet with the QoS requirement at intervals of two short IFS (SIFS) with a acknowledgement signal ACK.

10. A communication system, comprising:
    a plurality of first stations, for transmitting data by using an 802.11 protocol; and
    a plurality of second stations, for transmitting data which supports QoS by using an 802.11e protocol, wherein one of the second stations is used as a CAT station of a medium access with Contention AssisTance (MACAT) protocol and obtains a medium access right with a first AC, wherein a method of using one of the second stations as the CAT station comprises voluntarily issuing the first AC after counting a second predetermined time by using a CAT timer in the second stations connected to a QAP which uses the 802.11e protocol and supports QoS, and obtaining the medium access right by using one of the second stations connected to the QAP, and by broadcasting a CAT packet to all the first stations and the other second stations, the other second stations stop contending for the medium access right for a first predetermined time according to the CAT packet, and the first stations transmit a packet with a QoS requirement according to the CAT packet.

11. The communication system according to claim 10, wherein the CAT packet comprises a TXOP field for specifying a time interval in which the first stations start the packet with the QoS requirement according to the CAT packet.

12. The communication system according to claim 10, wherein the CAT packet comprises a duration field, and the other second stations determines the first predetermined time according to the content of the duration field.

13. The communication system according to claim 10, wherein the first predetermined time is the sum of a DIFS time and a deferring window time.

14. The communication system according to claim 10, wherein the CAT timer in the second station gives timeout at every CAT interval to notify the second station to transmit the CAT packet, and the CAT timer adjusts the CAT interval by receiving CAT packets from the other second stations in order to avoid collision.

15. The communication system according to claim 14, wherein the CAT interval is adjusted through an adaptive interval method, and the adaptive interval method comprises adjusting the CAT interval according to the transmission frequency of the other second stations.

16. The communication system according to claim 10, wherein the packet with the QoS requirement is to transmit voice or video data.

17. The communication system according to claim 10, wherein the first stations randomly generate a deferring time within a deferring window according to the CAT packet, and the first stations detect a DIFS and the randomly generated deferring time to obtain the medium access right.

18. The communication system according to claim 17, wherein the CAT packet comprises a TXOP field for specifying a time interval in which the first stations start the packet with the QoS requirement according to the CAT packet, and the first stations transmit the packet with the QoS requirement at intervals of two short IFS (SIFS) with a acknowledgement signal ACK.

* * * * *